Dec. 19, 1967     J. W. EHLEN     3,358,523
SPROCKET FOR SAW CHAINS
Filed Aug. 12, 1965
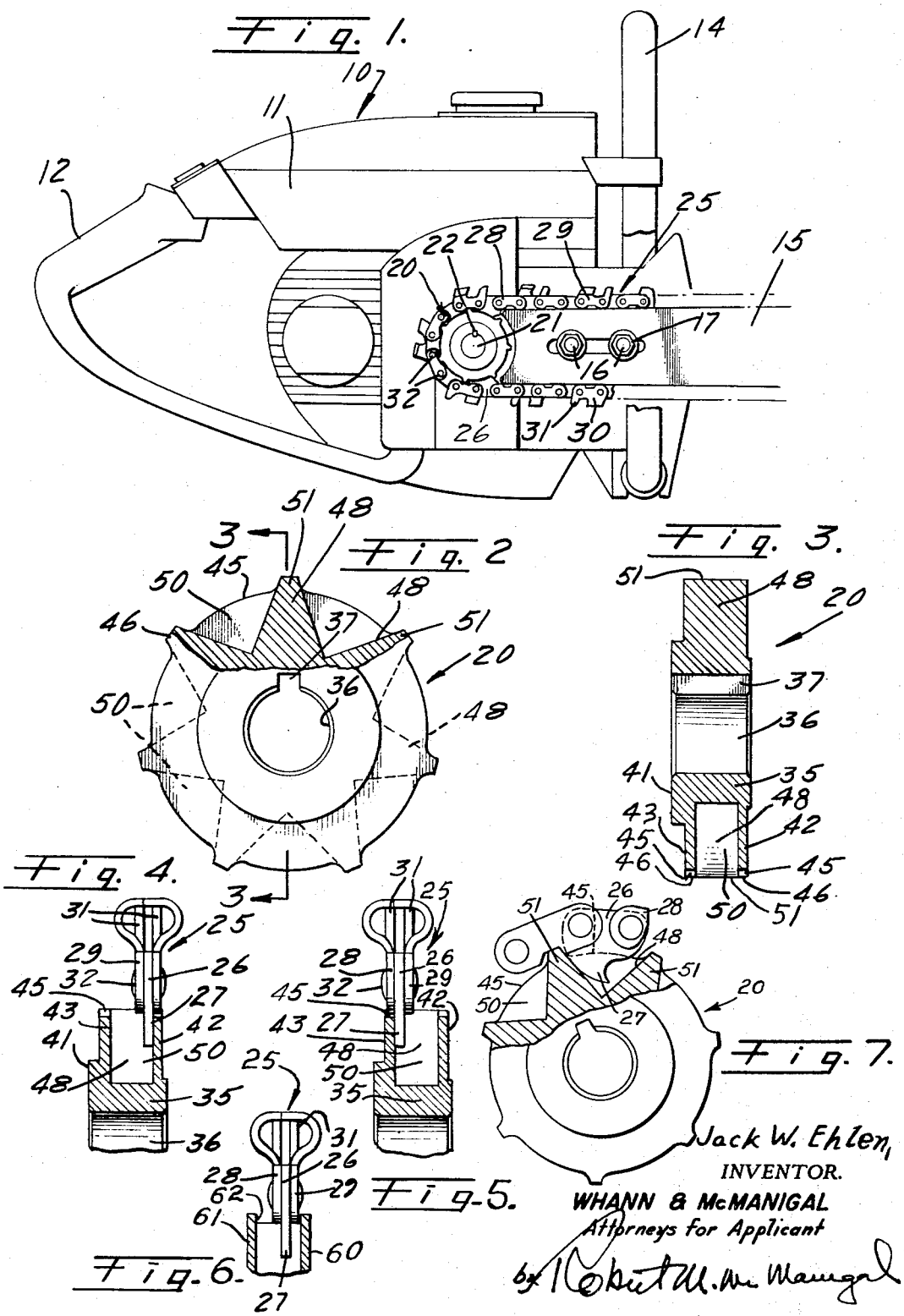

United States Patent Office 3,358,523
Patented Dec. 19, 1967

3,358,523
SPROCKET FOR SAW CHAINS
Jack W. Ehlen, Torrance, Calif., assignor to McCulloch Corporation, Los Angeles, Calif., a corporation of Wisconsin
Filed Aug. 12, 1965, Ser. No. 479,158
3 Claims. (Cl. 74—243)

ABSTRACT OF THE DISCLOSURE

A sprocket for saw chains to permit lateral movement of the chain on the sprocket so that the chain may be more easily kept in proper alignment with the chain saw bar. The sprocket according to the invention permits the chain to travel or move laterally as much as 44 percent more than as heretofore been possible with conventional sprockets.

---

This invention relates generally to chain saws and relates more particularly to sprockets on which the saw chain is operably mounted.

While the invention has particularly utility in connection with sprockets for chain saw chains, and is shown and described in this connection, it is to be understood that its utility is not confined thereto.

As is well known, certain problems or difficulties are encountered in providing sprockets for the chains of chain saws, one of these being the difficulty in accurate lining up of the sprocket with the peripheral grooves of the saw blade or bar so that the saw chain will be maintained in operable alignment with the sprocket and grooves of said saw blade or bar and it is an object of the prevent invention to provide a sprocket for saw chains that overcomes this problem or difficulty.

Another object of the invention is to provide a sprocket of this character that will allow the chain to laterally adjust itself to the bar groove. This advantageous result is obtained by contouring the side plates of the sprocket sufficiently to provide clearance for the side links of the chain.

Still another object of the invention is to provide a sprocket that eliminates the chain climbing over the side of the sprocket and jumping off.

A further object of the invention is to provide a sprocket of this character on which the chain has as much as forty-four percent (44%) more lateral travel than have conventional sprockets.

A still further object of the invention is to provide a sprocket of this character that is simple in construction.

Another object of the invention is to provide a sprocket of this character that is effective and reliable.

Still another object of the invention is to provide a sprocket of this character that is relatively inexpensive to manufacture.

The characteristics and advantages of the invention are further sufficiently referred to in connection with the following detailed description of the accompanying drawings, which represent one arrangement. After considering this example skilled persons will understand that many variations may be made without departing from the principles disclosed and I contemplate the employment of any structures, arrangements or modes of operation that are properly within the scope of the appended claims.

Referring to the drawings, which are for illustrative purposes only:

FIG. 1 is a side elevational view of the rear end of a chain saw showing the sprocket of the present invention operably mounted thereon;

FIG. 2 is an enlarged side or side elevational view of the sprocket with a portion broken away;

FIG. 3 is a sectional view taken on line 3—3 of FIG. 2;

FIG. 4 is a fragmentary sectional view showing a portion of a saw chain operably mounted thereon and disposed at one side;

FIG. 5 is a similar view showing the chain at the opposite side;

FIG. 6 is a similar view showing the chain at an intermediate position; and

FIG. 7 is an enlarged side view of the sprocket with a portion broken away, illustrating the engagement of a tang of the chain with a sprocket tooth.

Referring more particularly to the drawings, there is shown in FIG. 1 a rear end portion of a chain saw having a sprocket embodying the present invention. The saw is indicated generally at 10 and includes a housing 11 in which an engine, not shown, is disposed. There is a handle 12 at the rear of the housing and a handle 14 at the forward end thereof. A saw blade 15 is attached to the housing in the usual manner by bolts 16 with nuts 17 thereon. Adjacent the rear end of the blade is a sprocket, indicated generally at 20, the saw having the usual shaft 21 on which the sprocket is secured. Any well known means may be used to secure the sprocket on the shaft 21, one such means being a key 22 of well known character.

The saw chain, indicated generally at 25, is operably mounted on the periphery of the blade 15 and on the sprocket 20, which is operably aligned with the usual peripheral groove of the blade 15. Chain 25 is of the usual well known character and includes center links 26 which have tangs 27 whereby the chain is driven by the sprocket. There are also side links 28 which are simple links, and side links 29 which have cutters 30 and depth gauges 31 thereon. The links are pivotally connected together in the usual well known manner by means of pivot pins or pintles 32.

Sprocket 20 is unitary or integral and comprises a hub portion 35, having a central or axial bore 36 therethrough with a key-way 37 for reception of the key 22. There are side or end plates 42 and 43 integral with the hub, said side or end plates being spaced axially apart and there is an annular, integral boss 41 at the inner end of the sprocket.

Side or end plates 42 and 43 have a plurality of annularly spaced relieved portions 45 with small teeth 46 separating adjacent relieved portions 45. Corresponding teeth 46 of plates 42 and 43 are in alignment with each other.

Between the side plates 42 and 43 are teeth 48 integral with the hub portion 35 and the side plates 42 and 43. Teeth 48 are triangular in shape with the apex in alignment with the teeth 46 at the respective ends of said teeth 48.

The sprocket may be formed by casting, such as investment casting, for example.

As shown in FIG. 7, a saw chain operably mounted on the sprocket is so positioned thereon that the tangs 27 of the center links extend into the spaces 50 between the side plates and the teeth 48. As the sprocket is driven by the engine the teeth 48 engage the tangs 27 and thereby operably drive the chain 25.

Should the saw chain be perfectly aligned with the peripheral grooves of the blade 15 the chain portion on the sprocket would be carried by the outer ends 51 of the teeth 48. However, should there be a misalignment of the sprockets with respect to the peripheral grooves of the blade 15, the chain might travel adjacent one or the other of the side or end plates 42 and 43. When the saw chain is thus positioned the side links of one side or the other of the chain, depending upon the position of the chain on the sprocket, will be received in the relieved portions or shallow notches 45 of the respective side or end plates.

The chain has a lateral or axial travel on the sprocket, as shown in FIGS. 4 and 5. In FIG. 4 the chain is at its outermost position, which is limited by engagement of the tang 27 with the outer plate 42, and in FIG. 5 the chain is at the innermost position whereat the tang 27 engages the adjacent side of the side plate 43 and limits inward movement of the chain on the sprocket.

It will be apparent from the comparison of the sprocket shown in FIGS. 1 through 5 and the sprocket shown in FIG. 6 that the chain has a much greater movement laterally or axially of the sprocket than with the conventional type of sprocket shown in FIG. 6.

In FIG. 6 the side plates are indicated at 60 and 61 and these side plates do not have relieved peripheral portions as in the present invention. In FIG. 6 the side links 29 of that portion of the saw chain on this sprocket will engage peripheral edge portions 62 of the side plates should the sprocket have some misalignment with respect to the peripheral grooves of the blade 15 and consequently the sprocket of FIG. 6 must be aligned with the peripheral grooves of the blade with far greater accuracy than with the present sprocket. Consequently the present sprocket will operate properly even though there may be considerable misalignment between said sprocket and the peripheral grooves of the blade 15.

The invention and its attendant advantages will be understood from the foregoing description and it will be apparent that various changes will be made in the form, construction and arrangement of the parts of the invention without departing from the spirit and scope thereof or sacrificing its material advantages, the arrangement hereinbefore described being merely by way of example, and I do not wish to be restricted to the specific forms shown or uses mentioned except as defined in the accompanying claims, wherein various portions have been separated for clarity of reading and not for emphasis.

I claim:
1. In a sprocket for saw chains, said chains including side links:
   (A) a central portion;
   (B) side walls for said central portion,
   (C) said side walls being axially spaced apart; and
   (D) annularly spaced teeth between said side walls,
   (E) said side walls having annularly spaced peripheral notches axially aligned with the spaces between said teeth,
   (F) said peripheral notches being adapted to receive side link portions therein,
   (G) said side plates having small teeth separating said notches and being axially aligned with the outer ends of the teeth between the side walls.
2. In a sprocket for saw chains having side links:
   (A) a hub portion having an axial bore therethrough for reception of a rotatable shaft;
   (B) side walls extending radially from said hub in axially spaced relationship relative to each other; and
   (C) teeth between and extending to said side walls,
   (D) said side walls having annularly spaced peripheral notches axially aligned with the spaces between said teeth adapted for reception of lower portions of side links of a chain operably disposed on the sprocket,
   (E) said teeth having axially directed extensions spacing said notches and adapted to support said links when portions thereof extend into said notches.
3. In a sprocket for articulate saw chains, including center links having inwardly extending tangs:
   (A) a hub having an axial bore therethrough for reception of a rotatable shaft;
   (B) axially spaced side walls integral with said hub, there being space between said side walls for reception of tangs of said chain;
   (C) annularly spaced, peripheral teeth on said side walls, corresponding teeth of said side walls being in operable alignment with each other, there being shallow peripheral recesses between said teeth adapted for reception of side links of said chain;
   (D) and teeth integral with said side walls, said teeth being triangular in cross section, the apexes of said teeth being in alignment with the respective teeth of the side walls and of the same height as the latter, the triangular teeth being for driving engagement with the tangs of said center links and for operably carrying said chain.

References Cited
UNITED STATES PATENTS

| | | | |
|---|---|---|---|
| 616,072 | 12/1898 | Bradley | 74—243 |
| 1,624,892 | 4/1927 | Kottlowski | 74—243 |
| 3,099,924 | 8/1963 | Armstrong | 74—243 |
| 3,124,177 | 3/1964 | Ekrud | 74—243 |
| 3,283,789 | 11/1966 | Silvon | 143—32 |

FRED C. MATTERN, Jr., *Primary Examiner.*

DAVID J. WILLIAMOWSKY, *Examiner.*

C. J. HUSAR, *Assistant Examiner.*